(12) United States Patent
Yamazaki et al.

(10) Patent No.: US 12,537,211 B2
(45) Date of Patent: Jan. 27, 2026

(54) INFORMATION PROCESSING DEVICE AND VEHICLE

(71) Applicant: HONDA MOTOR CO., LTD., Tokyo (JP)

(72) Inventors: Keiko Yamazaki, Saitama (JP); Hiromichi Yoshida, Saitama (JP); Tomohito Kotake, Saitama (JP); Kiyohide Hibino, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 501 days.

(21) Appl. No.: 18/129,408

(22) Filed: Mar. 31, 2023

(65) Prior Publication Data

US 2023/0317995 A1  Oct. 5, 2023

(30) Foreign Application Priority Data

Mar. 31, 2022  (JP) .................. 2022-060175

(51) Int. Cl.
| | |
|---|---|
| *H01M 8/04992* | (2016.01) |
| *B60L 58/33* | (2019.01) |
| *H01M 8/04089* | (2016.01) |
| *H01M 8/04223* | (2016.01) |
| *H01M 8/0432* | (2016.01) |

(Continued)

(52) U.S. Cl.
CPC ......... *H01M 8/04992* (2013.01); *B60L 58/33* (2019.02); *H01M 8/04097* (2013.01); *H01M 8/04231* (2013.01); *H01M 8/04358* (2013.01); *H01M 8/04544* (2013.01);

(Continued)

(58) Field of Classification Search
CPC ..... H01M 2008/1095; H01M 2250/20; H01M 16/006; B60L 58/33; B60L 50/72; B60L 58/30; B60L 58/32; B60L 3/0053; Y02E 60/50

See application file for complete search history.

(56) References Cited

U.S. PATENT DOCUMENTS

| | | | |
|---|---|---|---|
| 2009/0023040 A1* | 1/2009 | Paik ................... | H01M 8/0662 |
| | | | 429/429 |
| 2013/0065150 A1 | 3/2013 | Matsusue | |
| 2015/0125772 A1 | 5/2015 | Matsusue et al. | |

FOREIGN PATENT DOCUMENTS

| | | |
|---|---|---|
| JP | 2011-243477 A | 12/2011 |
| WO | WO 2013/128610 A1 | 9/2013 |

* cited by examiner

*Primary Examiner* — Adam A Arciero
(74) *Attorney, Agent, or Firm* — Paratus Law Group, PLLC

(57) ABSTRACT

An information processing device includes an acquisition unit which acquires use history information indicating a use history of a vehicle, a prediction unit which predicts an output decrease amount of a fuel cell in a vehicle based on the use history information acquired by the acquisition unit and output decrease characteristic information indicating an output decrease characteristic of the fuel cell according to the use history, and a control unit which executes predetermined control based on the output decrease amount predicted by the prediction unit. When the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

8 Claims, 5 Drawing Sheets

(51) Int. Cl.
*H01M 8/04537* (2016.01)
*H01M 8/10* (2016.01)
(52) U.S. Cl.
CPC .................. *H01M 8/04604* (2013.01); *H01M 2008/1095* (2013.01); *H01M 2250/20* (2013.01)

INFORMATION PROCESSING DEVICE AND VEHICLE

CROSS-REFERENCE TO RELATED APPLICATION

The present application claims priority from Japanese Patent Application No. 2022-060175 filed on Mar. 31, 2022, the entire content of which is incorporated herein by reference.

TECHNICAL FIELD

The present invention relates to an information processing device and a vehicle including the information processing device.

BACKGROUND ART

In recent years, researches and development on a fuel cell that contributes to efficiency of energy have been carried out to ensure access to affordable, reliable, sustainable, and modem energy for more people. In recent years, as one of efforts for implementing a low-carbon society or a decarbonization society, a fuel cell electric vehicle including a fuel cell as a power source and a drive source driven by electric power of the fuel cell has been developed (for example, see JP2011-243477A and WO2013/128610).

The fuel cell deteriorates as the fuel cell is used, and a rated output gradually decreases. Therefore, in a fuel cell system including a fuel cell as a power source of a fuel cell electric vehicle or the like, it is desirable to execute control in consideration of a degree of deterioration of the fuel cell.

SUMMARY

The present invention provides an information processing device and a vehicle capable of preventing output decrease due to deterioration of a fuel cell by executing control in consideration of a degree of deterioration of the fuel cell, and ensuring an output of the fuel cell.

According to a first aspect of the present invention, there is provided an information processing device for predicting an output decrease amount of a fuel cell in a vehicle including the fuel cell and a drive source driven by electric power of the fuel cell. The information processing device includes an acquisition unit configured to acquire use history information indicating a use history of the vehicle, a prediction unit configured to predict the output decrease amount based on the use history information acquired by the acquisition unit and output decrease characteristic information indicating an output decrease characteristic of the fuel cell according to the use history, and a control unit configured to execute predetermined control based on the output decrease amount predicted by the prediction unit. When the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

According to a second aspect of the present invention, there is provided a vehicle including the information processing device according to the first aspect of the present invention, the fuel cell, and the drive source.

According to a second aspect of the present invention, there is provided an information processing device for predicting an output decrease amount of a fuel cell in a fuel cell system including the fuel cell. The information processing device includes an acquisition unit configured to acquire use history information indicating a use history of the fuel cell system, a prediction unit configured to predict the output decrease amount based on the use history information acquired by the acquisition unit and output decrease characteristic information indicating an output decrease characteristic of the fuel cell according to the use history, and a control unit configured to execute predetermined processing based on the output decrease amount predicted by the prediction unit. When the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

According to the present invention, it is possible to provide the information processing device and the vehicle capable of preventing output decrease due to deterioration of the fuel cell by executing control in consideration of a degree of deterioration of the fuel cell, and ensuring an output of the fuel cell.

DESCRIPTION OF EMBODIMENTS

Hereinafter, an embodiment of an information processing device and a vehicle including the information processing device according to the present invention will be described. In the following description, the same or similar elements are denoted by the same or similar reference signs, and the description thereof may be omitted or simplified as appropriate.

<Vehicle>

Figure 1:
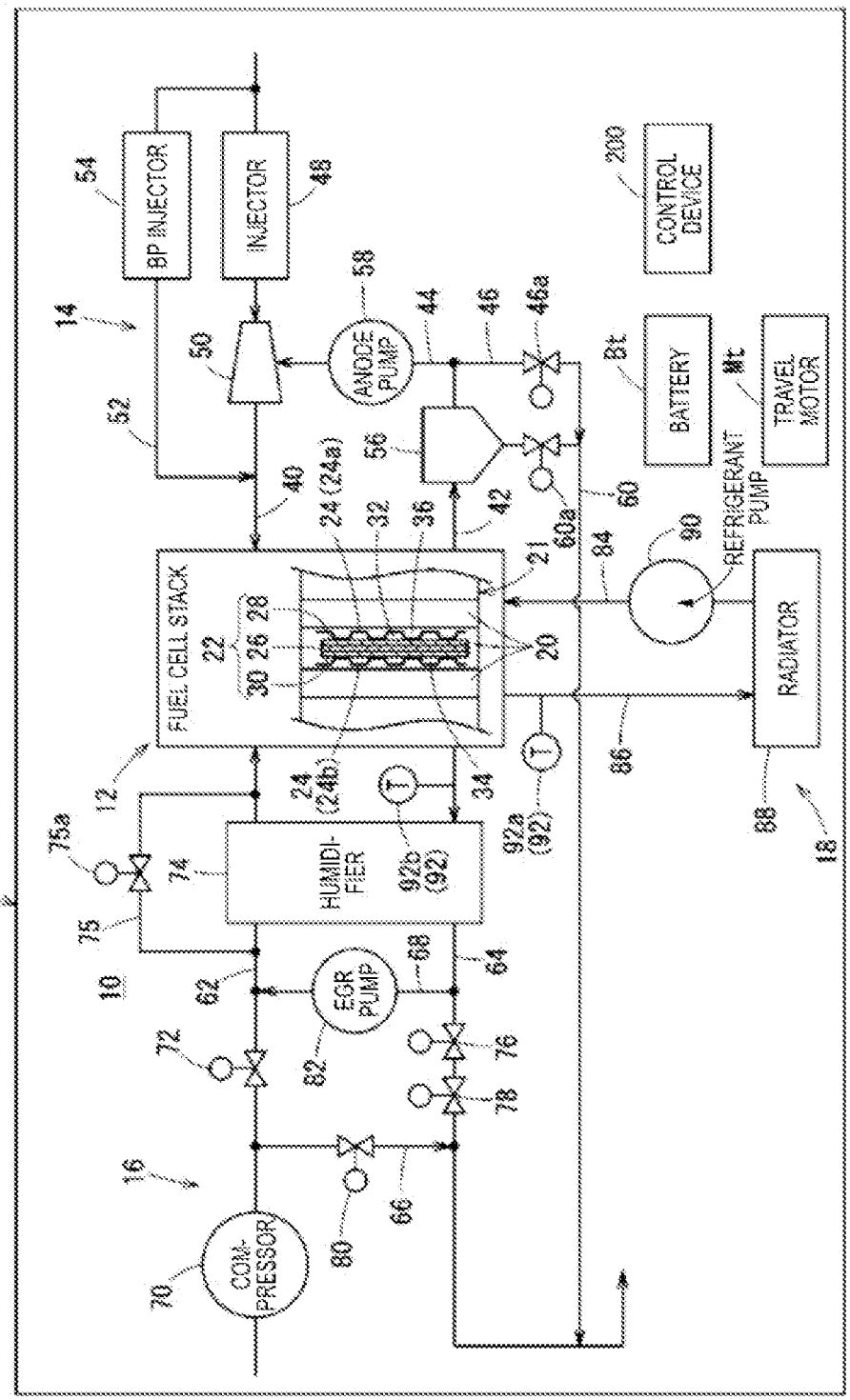
FIG. 1 is a diagram showing an overall configuration of a vehicle 100 according to an embodiment.

As shown in FIG. 1, a vehicle 100 according to the present embodiment includes a fuel cell system 10. The fuel cell system 10 includes a fuel cell stack 12, an anode system device 14, a cathode system device 16, and a cooling device 18. The fuel cell system 10 is mounted in a motor room, for example, of the fuel cell vehicle 100 (fuel cell electric vehicle, hereinafter simply referred to as "vehicle 100"), and supplies electric power generated by the fuel cell stack 12 to a battery Bt, a travel motor Mt, and the like to drive the vehicle 100.

The fuel cell stack 12 includes a plurality of power generation cells 20 for generating power by an electrochemical reaction between anode gas (fuel gas such as hydrogen) and cathode gas (oxidant gas such as air). The plurality of power generation cells 20 are implemented as a stacked body 21 stacked along a vehicle width direction with electrode surfaces in a standing posture in a state in which the fuel cell stack 12 is mounted on the vehicle 100. The plurality of power generation cells 20 may be stacked in a vehicle length direction (front-rear direction) or in a gravity direction of the vehicle 100.

Each of the power generation cells 20 includes an electrolyte membrane/electrode structure 22 (hereinafter referred to as "MEA 22") and a pair of separators 24 (separator 24a and separator 24b) sandwiching the MEA 22. The MEA 22 includes an electrolyte membrane 26 (for example, a solid polymer electrolyte membrane (cation exchange membrane)), an anode electrode 28 provided at one surface of the electrolyte membrane 26, and a cathode electrode 30 provided at the other surface of the electrolyte membrane 26. Although the detailed description and illustration are omitted, each of the anode electrode 28 and the cathode electrode 30 is implemented by providing a catalyst layer and a gas diffusion layer in this order from an electrolyte membrane 26 side. The catalyst layer (hereinafter, also simply referred to as "catalyst") of each of the anode electrode 28 and the cathode electrode 30 includes, for example, platinum particles for increasing a reaction rate of the electrochemical reaction between the anode gas and the cathode gas, and carbon as a carrier for supporting the platinum particles. As the fuel cell stack 12 generates power, sulfate ions or the like may adhere to the catalyst. Such adhering substances adhered to the catalyst can be one of main factors of deterioration (in other words, output decrease) of the fuel cell stack 12.

The separator 24a forms an anode gas flow path 32 through which anode gas flows at one surface of the MEA 22. The separator 24b forms a cathode gas flow path 34 through which cathode gas flows at the other surface of the MEA 22. A refrigerant flow path 36 through which a refrigerant flows is formed at surfaces where the separator 24a and the separator 24b face each other by stacking the plurality of power generation cells 20.

Further, the fuel cell stack 12 includes a plurality of communication holes (anode gas communication holes, cathode gas communication holes, and refrigerant communication holes) (not shown) through which each of the anode gas, the cathode gas, and the refrigerant flows along a stacking direction of the stacked body 21. The anode gas communication holes communicate with the anode gas flow path 32, the cathode gas communication holes communicate with the cathode gas flow path 34, and the refrigerant communication holes communicate with the refrigerant flow path 36.

The anode gas is supplied to the fuel cell stack 12 by the anode system device 14. In the fuel cell stack 12, the anode gas flows through an anode gas communication hole (anode gas inlet communication hole) to flow into the anode gas flow path 32, and is used for power generation in the anode electrode 28. Anode off-gas (including unreacted hydrogen) used for the power generation flows out from the anode gas flow path 32 to an anode gas communication hole (anode gas outlet communication hole), and is discharged from the fuel cell stack 12 to the anode system device 14.

The cathode gas is supplied to the fuel cell stack 12 by the cathode system device 16. In the fuel cell stack 12, the cathode gas flows through a cathode gas communication hole into the cathode gas flow path 34, and is used for power generation in the cathode electrode 30. Cathode off-gas used for the power generation flows out from the cathode gas flow path 34 to a cathode gas communication hole, and is discharged from the fuel cell stack 12 to the cathode system device 16.

Further, the refrigerant is supplied to the fuel cell stack 12 by the cooling device 18. In the fuel cell stack 12, the refrigerant flows through a refrigerant communication hole into the refrigerant flow path 36, and cools the power generation cell 20. The refrigerant which has cooled the power generation cell 20 flows out from the refrigerant flow path 36 to a refrigerant communication hole, and is discharged from the fuel cell stack 12 to the cooling device 18.

The stacked body 21 of the fuel cell stack 12 is housed in, for example, a stack case (not shown). A terminal plate, an insulating plate, and an end plate (not shown) are arranged in this order outward at both ends of the stacked body 21 in the stacking direction. The end plate applies a tightening load along the stacking direction of the power generation cells 20.

The anode system device 14 of the fuel cell system 10 includes an anode supply path 40 for supplying anode gas to the fuel cell stack 12, and an anode discharge path 42 for discharging anode off-gas from the fuel cell stack 12. An anode circulation path 44 is coupled between the anode supply path 40 and the anode discharge path 42 for returning unreacted hydrogen in the anode off-gas of the anode discharge path 42 to the anode supply path 40. Further, the anode circulation path 44 is coupled to a purge path 46 for discharging the anode off-gas from a circulation circuit of the anode system device 14.

An injector 48 and an ejector 50 are provided in series in the anode supply path 40, and a supply bypass path 52 is coupled across the injector 48 and the ejector 50. A bypass (BP) injector 54 is provided in the supply bypass path 52. The injector 48 is a main injector mainly used during power generation, and the BP injector 54 is a sub injector used to supply a high concentration of hydrogen when the fuel cell stack 12 is started or when a high load of power generation is required.

The ejector 50 supplies anode gas to the fuel cell stack 12 downstream while sucking the anode off-gas from the anode circulation path 44 by a negative pressure generated by movement of the anode gas ejected from the injector 48.

The anode discharge path 42 is provided with a gas-liquid separator 56 for separating water (generated water during power generation) in the anode off-gas from the anode off-gas. The anode circulation path 44 is coupled to an upper portion of the gas-liquid separator 56, and anode off-gas (gas) flows to the anode circulation path 44.

The anode circulation path 44 is provided with an anode pump 58 for circulating the anode off-gas to the anode supply path 40. Further, one end of a drain path 60 for discharging the separated water is coupled to a bottom of the gas-liquid separator 56. The drain path 60 is provided with a drain valve 60a for opening and closing a flow path. The purge path 46 is coupled to the drain path 60, and a purge valve 46a for opening and closing a flow path is provided on the way.

The cathode system device 16 of the fuel cell system 10 includes a cathode supply path 62 for supplying cathode gas to the fuel cell stack 12, and a cathode discharge path 64 for discharging cathode off-gas from the fuel cell stack 12.

Between the cathode supply path 62 and the cathode discharge path 64, a cathode bypass path 66 for allowing the cathode gas in the cathode supply path 62 to directly flow to the cathode discharge path 64 and a cathode circulation path 68 for circulating the cathode off-gas in the cathode discharge path 64 to the cathode supply path 62 are coupled.

The cathode supply path 62 is provided with a compressor 70 which compresses air from the atmosphere and supplies the air. The cathode supply path 62 includes a supply-side on-off valve 72 downstream of the compressor 70 and downstream of the cathode bypass path 66, and a humidifier 74 between the compressor 70 (specifically, downstream of the supply-side on-off valve 72) and the fuel cell stack 12. Although not shown, the cathode supply path 62 is provided with an auxiliary device such as an intercooler for cooling the cathode gas. Further, in the vicinity of the humidifier 74 in the cathode supply path 62, a humidifier bypass path 75 for bypassing the humidifier 74 is provided, and a humidifier bypass valve 75a for opening and closing the humidifier bypass path 75 is provided.

The humidifier 74 is provided in the cathode discharge path 64. The humidifier 74 humidifies the cathode gas in the cathode supply path 62 with moisture in the cathode off-gas in the cathode discharge path 64. The cathode discharge path 64 includes a discharge-side on-off valve 76 and a back pressure valve 78 downstream of the humidifier 74 and the cathode circulation path 68. Further, the drain path 60 of the anode system device 14 is coupled to the cathode discharge path 64.

The cathode bypass path 66 is provided with a flow rate regulating valve 80 for regulating a flow rate of the cathode gas bypassing the fuel cell stack 12. The cathode circulation path 68 is provided with an EGR pump 82 for circulating the cathode off-gas in the cathode discharge path 64 to the cathode supply path 62.

The cooling device 18 of the fuel cell system 10 has a refrigerant supply path 84 for supplying a refrigerant to the fuel cell stack 12, and a refrigerant discharge path 86 for discharging a refrigerant from the fuel cell stack 12. The refrigerant supply path 84 and the refrigerant discharge path 86 are coupled to a radiator 88 which cools the refrigerant. The refrigerant supply path 84 is provided with a refrigerant pump 90 for circulating a refrigerant in a refrigerant circulation circuit (between the fuel cell stack 12, the refrigerant supply path 84, the refrigerant discharge path 86, and the radiator 88).

The fuel cell system 10 includes a plurality of temperature sensors 92 for detecting a temperature of the fuel cell stack 12. Examples of the temperature sensors 92 include a refrigerant outlet temperature sensor 92a provided upstream (fuel cell stack 12 side) of the refrigerant discharge path 86, and a cathode outlet temperature sensor 92b provided upstream (fuel cell stack 12 side) of the cathode discharge path 64.

The fuel cell system 10 described above includes a control device (information processing device) 200 which controls an operation of each component in the fuel cell system 10. The control device 200 is implemented by, for example, an electronic control unit (ECU) including a processor which performs various calculations, a storage device having a non-transitory storage medium which stores various types of information, and an input and output device which controls input and output of data between an inside and an outside of the control device 200. The control device 200 may be implemented by one ECU or may be implemented by a plurality of ECUs.

<Control Device>

Figure 2:
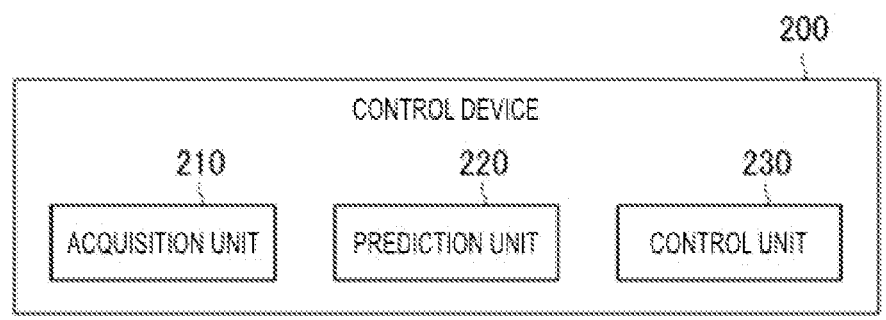
FIG. 2 is a block diagram showing an example of a functional configuration of a control device 200 in the vehicle 100.

As shown in FIG. 2, the control device 200 as the information processing device according to the present embodiment includes, for example, an acquisition unit 210, a prediction unit 220, and a control unit 230 as functional units which are implemented by a processor executing a program stored in the storage device of the control device 200.

The acquisition unit 210 acquires use history information indicating a use history of the vehicle 100. Here, the use history information is information indicating the use history of the vehicle 100 for an item related to deterioration (in other words, output decrease) of the fuel cell stack 12. For example, the use history information includes information indicating the number of times of starts of the vehicle 100 (in other words, the number of times of starts of the fuel cell stack 12), a power generation time of the fuel cell stack 12, and the number of times of fluctuations in an output voltage of the fuel cell stack 12 (hereinafter, also simply referred to as "the number of times of voltage fluctuations") as the item related to the deterioration of the fuel cell stack 12.

The use history information may include information indicating a start time of the vehicle 100 (in other words, a start time of the fuel cell stack 12), instead of or in addition to the information indicating the number of times of starts. The use history information may include information indicating the number of times of power generation of the fuel cell stack 12, instead of or in addition to the information indicating the power generation time. Further, the use history information may include information indicating the number of times of fluctuations in an output current of the fuel cell stack 12 (hereinafter, also simply referred to as "the number of times of current fluctuations"), instead of or in addition to the information indicating the number of times of voltage fluctuations. Generally, counting the number of times of current fluctuations can be implemented more easily in terms of control than counting the number of times of voltage fluctuations.

The use history information may include information indicating the power generation time and/or the number of times of power generation for each output current of the fuel cell stack 12. As a specific example, the use history information may include information in which the power generation time of the fuel cell stack 12 up to now is classified into power generation time for each output current, such as accumulation of the power generation time by an output current of Ia [A] being Na [h], and accumulation of the power generation time by an output current of Ib [A] being Nb [h]. The use history information may include information in which the number of times of power generation of the fuel cell stack 12 up to now is classified into the number of times of power generation for each output current, such as accumulation of the number of times of power generation by the output current of Ia [A] being Nx [times], and accumulation of the number of times of power generation by the output current of Ib [A] being Ny [times]. If the information indicating the power generation time and/or the number of times of power generation for each output current of the fuel cell stack 12 is in the use history information, it is possible to acquire a highly accurate output decrease amount even when an output decrease speed of the fuel cell stack 12 varies depending on a current value of the output current. Instead of or in addition to the information indicating the power generation time and/or the number of times of power generation for each output current, information indicating the power generation time and/or the number of times of power generation for each output voltage of the fuel cell stack 12 may be in the use history information. That is, the use history information may include information in which the power generation time or the number of times of power generation of the fuel cell stack 12 up to now is classified for each output voltage.

Further, the use history information may include information indicating a travel time and/or the number of times of traveling of the vehicle 100, and information indicating a stop time and/or the number of times of stopping of the vehicle 100.

Figure 3:
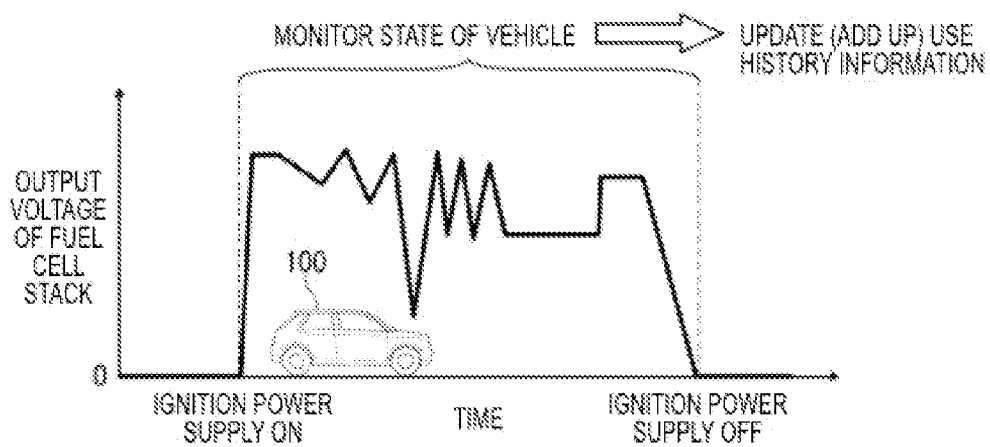
FIG. 3 is a diagram showing an example of update of use history information according to the embodiment.

For example, as shown in FIG. 3, the control device 200 monitors a state of the vehicle 100 including the output voltage of the fuel cell stack 12 while the vehicle 100 is started (while an ignition power supply is on). By this monitoring, the control device 200 successively adds up, for example, the number of times of starts of the vehicle 100, the power generation time of the fuel cell stack 12, and the number of times of voltage fluctuations in the fuel cell stack 12 from initial start of the vehicle 100, and stores the use history information indicating the number of times of starts of the vehicle 100, the power generation time of the fuel cell stack 12, and the number of times of voltage fluctuations in the fuel cell stack 12 from the initial start of the vehicle 100 to the present in the storage device of the control device 200.

The acquisition unit 210 acquires the use history information stored in the storage device of the control device 200 in this manner at a predetermined timing. A timing at which the acquisition unit 210 acquires the use history information may be, for example, at the time of starting the vehicle 100. In this way, it is possible to predict an output decrease amount of the fuel cell stack 12 each time the vehicle 100 is started. The timing at which the acquisition unit 210 acquires the use history information is not limited to when the vehicle 100 is started, and the acquisition unit 210 may, for example, acquire the use history information when a predetermined operation is received from a user. In this way, the user can predict the output decrease amount of the fuel cell stack 12 at a desired timing.

The prediction unit 220 predicts the output decrease amount of the fuel cell stack 12 based on the use history information acquired by the acquisition unit 210 and output decrease characteristic information indicating an output decrease characteristic of the fuel cell stack 12. Here, the output decrease characteristic information is stored in advance in the storage device of the control device 200, for example. The output decrease characteristic information may be stored in a storage device external to the control device 200 configured for reference by the control device 200.

Figure 4:
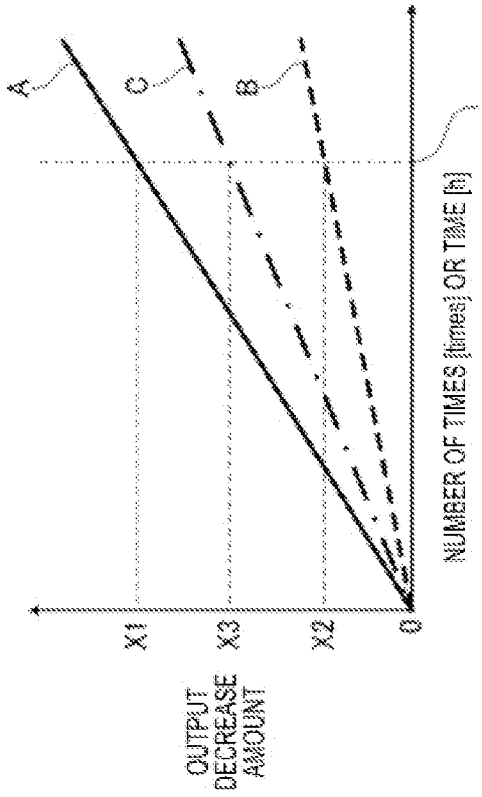
FIG. 4 is a diagram showing an example of output decrease characteristic information and a prediction example of an output decrease amount using the output decrease characteristic information according to the embodiment.

For example, as shown in (a) of FIG. 4, the output decrease characteristic information may be information indicating each output decrease characteristic, that is, an output decrease characteristic A, an output decrease characteristic B, and an output decrease characteristic C. Here, the output decrease characteristic A is an output decrease characteristic indicating an output decrease amount of the fuel cell stack 12 according to the number of times of starts of the vehicle 100. The output decrease characteristic A indicates that the output decrease amount of the fuel cell stack 12 also increases as the number of times of starts of the vehicle 100 increases, and for example, indicates that the output decrease amount of the fuel cell stack 12 is X1 when the number of times of starts of the vehicle 100 is n1 times (n1>0).

Here, the output decrease characteristic B is an output decrease characteristic indicating an output decrease amount of the fuel cell stack 12 according to the power generation time of the fuel cell stack 12. The output decrease characteristic B indicates that the output decrease amount of the fuel cell stack 12 also increases as the power generation time of the fuel cell stack 12 increases, and for example, indicates that the output decrease amount of the fuel cell stack 12 is X2 when the power generation time of the fuel cell stack 12 is n2 [h] (n2>0).

Here, the output decrease characteristic C is an output decrease characteristic indicating an output decrease amount of the fuel cell stack 12 according to the number of times of voltage fluctuations. The output decrease characteristic C indicates that the output decrease amount of the fuel cell stack 12 also increases as the number of times of voltage fluctuations increases, and for example, indicates that the output decrease amount of the fuel cell stack 12 is X3 when the number of times of voltage fluctuations is n3 (n3>0).

By referring to such output decrease characteristic information, the prediction unit 220 acquires the output decrease amount of the fuel cell stack 12 for each of the number of times of starts of the vehicle 100, the power generation time of the fuel cell stack 12, and the number of times of voltage fluctuations in the fuel cell stack 12 indicated by the use history information acquired by the acquisition unit 210. The prediction unit 220 derives a value obtained by adding up acquired output decrease amounts as a prediction result.

For example, as shown in (b) of FIG. 4, it is assumed that the output decrease amount for the number of times of starts of the vehicle 100 is X1, the output decrease amount for the power generation time of the fuel cell stack 12 is X2, and the output decrease amount for the number of times of voltage fluctuations is X3. In this case, the prediction unit 220 derives X10=X1+X2+X3 as the prediction result of the output decrease amount of the fuel cell stack 12.

For example, when the use history information includes information indicating the start time of the vehicle 100, output decrease characteristic information including information indicating the output decrease amount of the fuel cell stack 12 according to the start time of the vehicle 100 is prepared in advance. Similarly, when the use history information includes information indicating the number of times of power generation of the fuel cell stack 12, the travel time and/or the number of times of traveling of the vehicle 100, or the stop time and/or the number of times of stopping of the vehicle 100, output decrease characteristic information including information indicating the output decrease amount of the fuel cell stack 12 according to the number of times of power generation of the fuel cell stack 12, the travel time and/or the number of times of traveling of the vehicle 100, or the stop time and/or the number of times of stopping of the vehicle 100 is prepared in advance.

When the control unit 230 determines that a rated output of the fuel cell stack 12 is equal to or smaller than a threshold value Th based on the output decrease amount predicted by the prediction unit 220, the control unit 230 executes adhering substance removal control in which nitrogen-enriched gas having a higher nitrogen concentration and a lower oxygen concentration than air is supplied to the fuel cell stack 12 as cathode gas. Here, as the rated output of the fuel cell stack 12, a value obtained by subtracting the output decrease amount from an initial rated output of the fuel cell stack 12 is calculated.

Specifically, the adhering substance removal control is control for supplying cathode off-gas discharged from the fuel cell stack 12 to the cathode supply path 62. That is, the control unit 230 supplies the cathode off-gas discharged from the fuel cell stack 12 to the cathode supply path 62 by driving the EGR pump 82 by the adhering substance removal control.

The cathode off-gas discharged from the fuel cell stack 12 has a higher nitrogen concentration and a lower oxygen concentration than air. By supplying such cathode off-gas to the cathode supply path 62, the cathode gas supplied to the fuel cell stack 12 can be made nitrogen-enriched gas having a higher nitrogen concentration and a lower oxygen concentration than air. By supplying the nitrogen-enriched cathode gas to the fuel cell stack 12, the fuel cell stack 12 can generate power at a high current and a low voltage as compared with a case where non-nitrogen-enriched cathode gas (that is, air) is supplied to the fuel cell stack 12. In other words, the output current of the fuel cell stack 12 can be increased while preventing excessive electric power from being output from the fuel cell stack 12.

An amount of water generated during power generation of the fuel cell stack 12, that is, an amount of water in the cathode off-gas, is proportional to the output current of the fuel cell stack 12. Therefore, a large amount of generated water can be generated by increasing the output current of the fuel cell stack 12. By generating a large amount of generated water in this way, the catalyst can be actively cleaned using the generated water. Accordingly, it is possible to remove an adhering substance adhered to the catalyst as the fuel cell stack 12 is used, and to recover the rated output of the fuel cell stack 12 which is decreased due to the adhering substance.

More specifically, in the vehicle 100, a required output for the travel motor Mt is determined based on a travel speed and an accelerator position by a driver. The control unit 230 controls output of the fuel cell stack 12 to output the required output from the travel motor Mt. If the output of the fuel cell stack 12 exceeds the required output of the travel motor Mt, excessive power exceeding the required output can be output from the travel motor Mt. If excessive power exceeding the required output is output from the travel motor Mt, drivability deteriorates, leading to a decrease in marketability of the vehicle 100. The "excessive electric power" described above is, for example, electric power which causes the travel motor Mt to output power exceeding the required output.

Therefore, the control unit 230 executes adhering substance removal control for supplying the nitrogen-enriched cathode gas to the fuel cell stack 12, and enables the fuel cell stack 12 to generate power at a high current and a low voltage, thereby increasing the output current of the fuel cell stack 12 while setting an output of the fuel cell stack 12 to correspond to the required output of the travel motor Mt, and actively cleaning the catalyst using the generated water during power generation of the fuel cell stack 12. Accordingly, it is possible to remove an adhering substance adhered to the catalyst as the fuel cell stack 12 is used, and to recover the rated output of the fuel cell stack 12 which is decreased due to the adhering substance.

Figure 5:
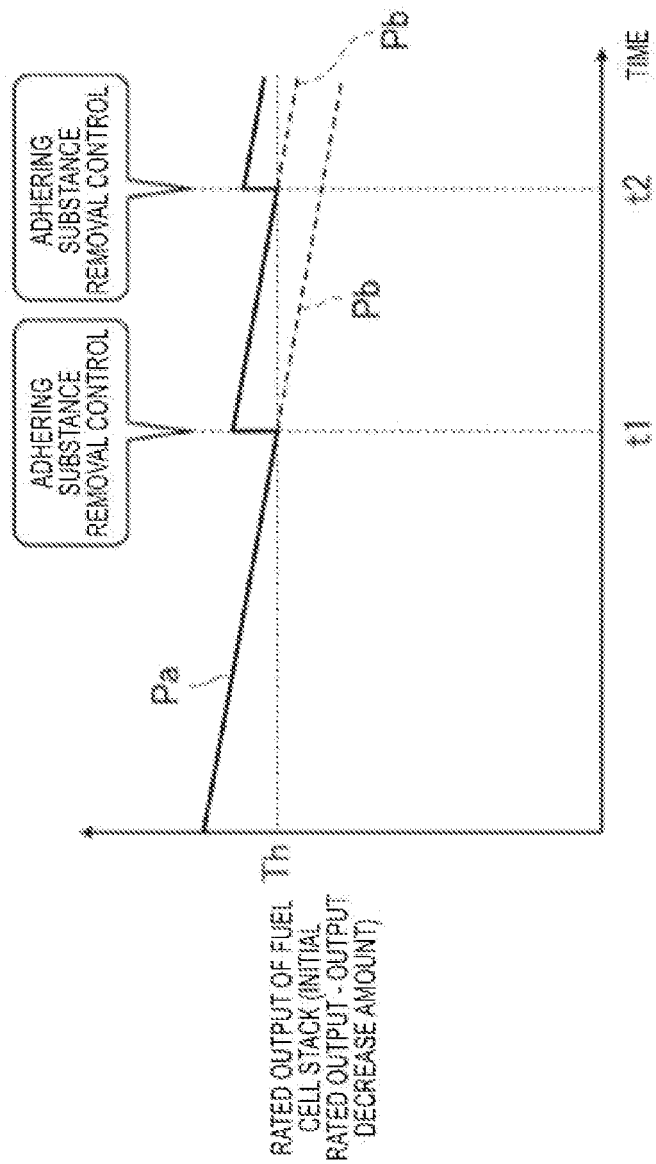
FIG. 5 is a diagram of a recovery effect of a rated output of a fuel cell stack 12 by adhering substance removal control.

For example, a time t1 and a time t2 shown in FIG. 5 are times at which a rated output Pa of the fuel cell stack 12 decreases and reaches the threshold value Th. As shown in FIG. 5, the control unit 230 executes the adhering substance removal control each time the rated output Pa of the fuel cell stack 12 decreases and reaches the threshold value Th, thereby making it possible to raise the rated output Pa to be higher than a rated output Pb of the fuel cell stack 12 when the adhering substance removal control is not executed each time.

Even if the rated output of the fuel cell stack 12 is not equal to or smaller than the threshold value Th, as long as a certain period of time elapses after previous execution of the adhering substance removal control, it is considered that a certain number of adhering substances are adhered to the catalyst.

Therefore, the control unit 230 may also execute the adhering substance removal control when a predetermined period elapses from previous adhering substance removal control. Here, the predetermined period may be a period set in advance for the control device 200 by, for example, a manufacturer of the fuel cell system 10 or the control device 200. As a specific example, the control unit 230 may execute the adhering substance removal control every five years after start of use of the vehicle 100 (the fuel cell system 10).

The predetermined period may be a period in which at least one of the power generation time of the fuel cell stack 12, the number of times of power generation, the number of times of fluctuations in the output voltage, and the number of times of fluctuations in the output current reaches a predetermined value. Here, the predetermined value is set in advance for the control device 200 by, for example, a manufacturer of the fuel cell system 10 or the control device 200.

Thus, by executing the adhering substance removal control when a predetermined period elapses since the previous adhering substance removal control is executed, the adhering substance removal control is executed in a situation in which it is considered that a certain number of adhering substances are adhered to the catalyst, the adhering substance adhered to the catalyst is removed, and the rated output of the fuel cell stack 12 which is decreased due to the adhering substance can be recovered.

<Processing Executed by Control Device>

Next, an example of processing executed by the control device 200 will be described with reference to FIG. 6. For example, when the vehicle 100 is in a travelable state, the control device 200 repeats the execution of the processing shown in FIG. 6 at a predetermined cycle.

Figure 6:
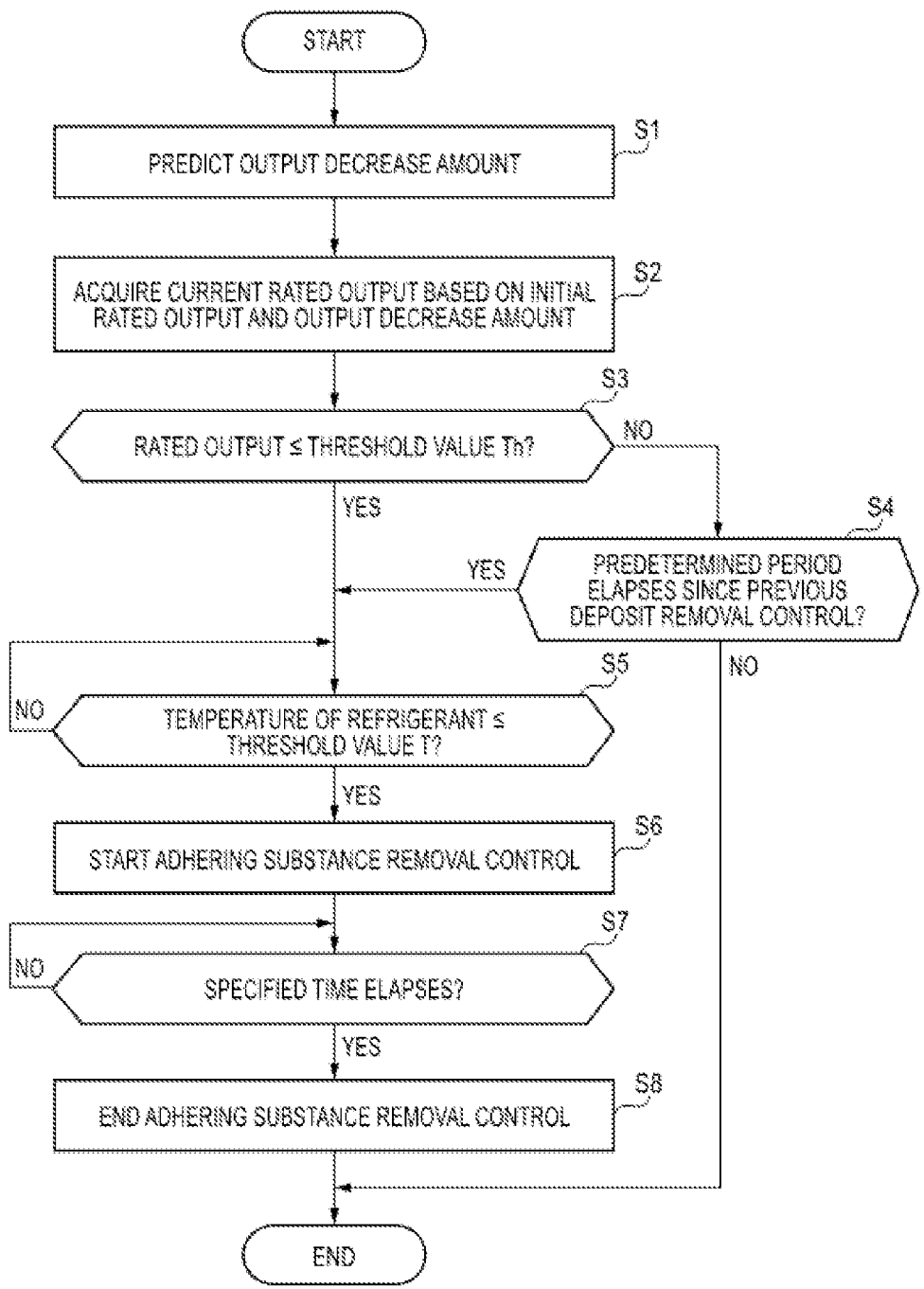
FIG. 6 is a flow chart showing an example of processing executed by the control device 200 according to the embodiment.

As shown in FIG. 6, the control device 200 predicts an output decrease amount of the fuel cell stack 12 (step S1), and acquires a current rated output based on an initial rated output and the predicted output decrease amount (step S2).

Next, the control device 200 determines whether the current rated output of the fuel cell stack 12 is equal to or smaller than the threshold value Th (step S3). As a result, when it is determined that the current rated output of the fuel cell stack 12 is equal to or smaller than the threshold value Th (step S3: Yes), the control device 200 proceeds to processing of step S5.

On the other hand, when it is determined that the current rated output of the fuel cell stack 12 is not equal to or smaller than the threshold value Th (step S3: No), the control device 200 determines whether a predetermined period elapses since previous adhering substance removal control (step S4). As a result, when it is determined that the predetermined period elapses from the previous adhering substance removal control (step S4: Yes), the control device 200 proceeds to the processing of step S5.

In step S5, the control device 200 determines whether a temperature of a refrigerant which cools the fuel cell stack 12 is equal to or lower than a threshold value T (step S5). As a result, when it is determined that the temperature of the refrigerant is equal to or lower than the threshold value T (step S5: Yes), the control device 200 starts the adhering substance removal control (step S6). The threshold value T is set in advance for the control device 200 by, for example, a manufacturer of the fuel cell system 10 or the control device 200.

The control device 200 determines whether a specified time elapses from the start of the adhering substance removal control (step S7), and when it is determined that the specified time elapses (step S7: Yes), the adhering substance removal control is ended (step S8). The specified time is set in advance for the control device 200 by, for example, a manufacturer of the fuel cell system 10 or the control device 200.

As described above, by executing the adhering substance removal control when the rated output of the fuel cell stack 12 becomes equal to or smaller than the threshold value Th or when a predetermined period elapses from the previous adhering substance removal control, the control device 200 can increase the output current of the fuel cell stack 12 while preventing excessive electric power from being output from the fuel cell stack 12, and can remove the adhering substance adhered to the catalyst and recover the rated output of the fuel cell stack 12.

When the temperature of the refrigerant which cools the fuel cell stack 12 is higher than the threshold value T, it is assumed that the fuel cell stack 12 is during high load power generation. Therefore, as described above, it is desirable that the control device 200 executes the adhering substance removal control only when the temperature of the refrigerant which cools the fuel cell stack 12 is equal to or lower than the threshold value T (step S5: Yes). In this way, it is possible to avoid a situation in which the adhering substance removal control is executed during high load power generation of the fuel cell stack 12, and avoid a decrease in electric power which can be output from the fuel cell stack 12. Accordingly, it is possible to ensure the electric power required to drive the travel motor Mt of the vehicle 100, and it is possible to avoid occurrence of slowness or the like of the vehicle 100 due to insufficient electric power. From a viewpoint of preventing the adhering substance removal control from being executed during high load power generation of the fuel cell stack 12, for example, the adhering substance removal control may be executed when an output current value of the fuel cell stack 12 is equal to or smaller than a first predetermined value and a state of charge (SOC) of the battery Bt is equal to or larger than a second predetermined value, instead of or in addition to above conditions based on the temperature of the refrigerant. In this case, the first predetermined value and the second predetermined value are set in advance for the control device 200 by a manufacturer of the fuel cell system 10 or the control device 200.

If the adhering substance removal control is executed when the temperature of the refrigerant which cools the fuel cell stack 12 is higher than the threshold value T, the fuel cell stack 12 may become overvoltage, and a temperature of the fuel cell stack 12 may further increase. If such a situation occurs, there is a concern that performance of the catalyst may be deteriorated. Therefore, also from this viewpoint, it is desirable that the control device 200 executes the adhering substance removal control only when the temperature of the refrigerant which cools the fuel cell stack 12 is equal to or lower than the threshold value T.

As described above, according to the embodiment of the present invention, by executing control in consideration of a degree of deterioration of the fuel cell stack 12, it is possible to prevent an output decrease due to deterioration of the fuel cell stack 12 and to ensure an output of the fuel cell stack 12. In addition, it is possible to contribute to efficiency of energy.

Although one embodiment of the present invention has been described above with reference to the accompanying drawings, it goes without saying that the present invention is not limited to such an embodiment. It will be apparent to those skilled in the art that various changes and modifications may be conceived within the scope of the claims. It is also understood that the various changes and modifications belong to the technical scope of the present invention. The respective constituent elements in the above embodiment may be combined as desired without departing from the gist of the invention.

For example, in the above embodiment, the control device 200 executes the adhering substance removal control when it is determined that the rated output of the fuel cell stack 12 calculated based on the predicted output decrease amount is equal to or smaller than the threshold value Th, but the present invention is not limited thereto. For example, the control device 200 may also execute the adhering substance removal control when a difference between the rated output of the fuel cell stack 12 (hereinafter, also referred to as an "output estimate") calculated based on the predicted output decrease amount and an actually measured output of the fuel cell stack 12 (hereinafter, also referred to as an "actual measurement value") is equal to or larger than a predetermined threshold value. That is, when the actual measurement value deviates from the output estimate by equal to or larger than a threshold value, a cause may be an adhering substance on the catalyst. Therefore, by executing the adhering substance removal control when the difference between the output estimate and the actual measurement value is equal to or larger than the threshold value, it is possible to recover the output of the fuel cell stack 12 which is decreased due to the adhering substance.

In the above embodiment, the adhering substance removal control is executed when it is determined that the rated output of the fuel cell stack 12 is equal to or smaller than the threshold value Th, but the present invention is not limited thereto. It is considered that the output decrease of the fuel cell stack 12 due to an adhering substance occurs not only during high load power generation in which the output of the fuel cell stack 12 becomes a rated output, but also during low load power generation. Therefore, for example, a threshold value (determination value) serving as a condition for executing the adhering substance removal control may be provided for each output (that is, load) of the fuel cell stack 12, and the adhering substance removal control may be executed when it is determined that the output of the fuel cell stack 12 is equal to or smaller than the threshold value corresponding to the output.

For example, when the rated output of the fuel cell stack 12 calculated based on the predicted output decrease amount becomes equal to or smaller than the threshold value Th, the control device 200 may notify the user of the fact and may receive an operation of selecting whether to execute the adhering substance removal control from the user. The control device 200 may execute the adhering substance removal control on condition that an operation to execute the adhering substance removal control is received from the user. Accordingly, it is possible to prevent the adhering substance removal control from being executed against an intention of the user. For example, when the control device 200 and a terminal device (for example, a smartphone) of a user can communicate with each other, the control device 200 may perform the notification or the like via the terminal device of the user. Further, for example, the control device 200 may download a program, data, or the like necessary for executing the adhering substance removal control from a server device capable of communicating with the control device 200, based on the reception of an operation of executing the adhering substance removal control from the user.

In the above embodiment, an example in which the information processing device according to the present invention is implemented by the control device 200 in the vehicle 100 is described, but the present invention is not limited thereto. For example, some or all of the functional units which are the acquisition unit 210, the prediction unit 220, and the control unit 230 of the control device 200 may be implemented by a server device capable of communicating with the control device 200. That is, the information processing device according to the present invention may be implemented by a server device capable of communicating with the control device 200 in the vehicle 100. The server device may be a virtual server (cloud server) implemented in a cloud computing service, or may be a physical server implemented as a single device.

Further, the information processing device according to the present invention is not limited to be in the vehicle 100, and can be applied to any fuel cell system including a fuel cell. Here, the fuel cell system can be, for example, a stationary residential power supply system including a fuel cell such as the fuel cell stack 12, which is referred to as a "residential fuel cell cogeneration system". When the present invention is applied to such a fuel cell system, the acquisition unit 210 in the control device 200 as an example of the information processing device may acquire use history information indicating a use history of the fuel cell system. The prediction unit 220 may predict an output decrease amount of the fuel cell based on the use history information acquired by the acquisition unit 210 and output decrease characteristic information indicating an output decrease characteristic of the fuel cell in the fuel cell system according to the use history of the fuel cell system. When the control unit 230 determines that a rated output of the fuel cell is equal to or smaller than a threshold value based on an output decrease amount predicted by the prediction unit 220, the control unit 230 may execute the adhering substance removal control in which nitrogen-enriched gas having a higher nitrogen concentration and a lower oxygen concentration than air is supplied to the fuel cell as the cathode gas. In this way, even when the information processing device according to the present invention is applied to an any fuel cell system including a fuel cell, it is possible to increase an output current of the fuel cell to increase generated water during power generation while preventing excessive electric power from being output from the fuel cell, and it is possible to actively clean an electrode of the fuel cell by the generated water. By removing an adhering substance adhered to the electrode, output decrease of the fuel cell due to the adhering substance can be reduced, and a rated output of the fuel cell can be recovered.

At least the following matters are described in the present specification. Components corresponding to those according to the above embodiment described above are shown in parentheses. However, the present invention is not limited thereto.

(1) An information processing device (control device 200) for predicting an output decrease amount of a fuel cell (fuel cell stack 12) in a vehicle (vehicle 100) including the fuel cell and a drive source (travel motor Mt) driven by electric power of the fuel cell, the information processing device including:
  an acquisition unit (acquisition unit 210) configured to acquire use history information indicating a use history of the vehicle;
  a prediction unit (prediction unit 220) configured to predict the output decrease amount based on the use history information acquired by the acquisition unit and output decrease characteristic information indicating an output decrease characteristic of the fuel cell according to the use history; and
  a control unit (control unit 230) configured to execute predetermined control based on the output decrease amount predicted by the prediction unit, in which
  when the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

According to (1), when it is determined that the rated output of the fuel cell is equal to or smaller than the threshold value, it is possible to execute the adhering substance removal control in which the nitrogen-enriched gas having a higher nitrogen concentration and a lower oxygen concentration than air is supplied to the fuel cell as the cathode gas. This enables the fuel cell to generate power at a high current and a low voltage as compared with a case where air is supplied to the fuel cell as the cathode gas. Therefore, it is possible to increase an output current of the fuel cell to increase generated water during power generation while preventing excessive electric power from being output from the fuel cell, and it is possible to actively clean an electrode (for example, a catalyst) of the fuel cell by the generated water. By removing an adhering substance adhered to the electrode, output decrease of the fuel cell due to the adhering substance can be reduced, and a rated output of the fuel cell can be recovered.

(2) The information processing device according to (1), in which
  the adhering substance removal control is control for supplying cathode off-gas discharged from the fuel cell to a cathode supply path (cathode supply path 62) for supplying the cathode gas to the fuel cell.

According to (2), the nitrogen-enriched gas can be generated by utilizing the cathode off-gas discharged from the fuel cell.

(3) The information processing device according to (1) or (2), in which
  the control unit further executes the adhering substance removal control when a predetermined period elapses from previous adhering substance removal control.

According to (3), since the adhering substance removal control is executed when the predetermined period elapses since the previous adhering substance removal control, the adhering substance removal control can be executed in a situation in which it is assumed that a certain number of adhering substances are adhered to the electrode, and the adhering substance adhered to the electrode can be removed.

(4) The information processing device according to (3), in which
  the predetermined period is a period in which at least one of a power generation time, the number of times of power generation, the number of times of fluctuations in an output voltage, and the number of times of fluctuations in an output current of the fuel cell reaches a predetermined value.

According to (4), since the adhering substance removal control is executed when at least one of the power generation time, the number of times of power generation, the number of times of fluctuations in the output voltage, and the number of times of fluctuations in the output current of the fuel cell reaches the predetermined value from the previous adhering substance removal control, it is possible to remove an adhering substance adhered to the electrode by executing the adhering substance removal control in a situation in which it is assumed that a certain number of adhering substances are adhered to the electrode.

(5) The information processing device according to any one of (1) to (4), in which
the control unit executes the adhering substance removal control when a temperature of a refrigerant which cools the fuel cell is equal to or lower than a threshold value (threshold value T).

When the temperature of the refrigerant which cools the fuel cell is higher than the threshold value, it is assumed that the fuel cell is during high load power generation. According to (5), since the adhering substance removal control is executed when the temperature of the refrigerant which cools the fuel cell is equal to or lower than the threshold value, it is possible to avoid execution of the adhering substance removal control during high load power generation of the fuel cell, in which the electric power which can be output from the fuel cell may be decreased. Accordingly, it is possible to ensure electric power required to drive the drive source of the vehicle, and it is possible to avoid occurrence of slowness or the like of the vehicle due to insufficient electric power.

(6) The information processing device according to any one of (1) to (5), in which
the control unit further executes the adhering substance removal control when a difference between the rated output calculated based on the predicted output decrease amount and an actually measured output of the fuel cell is equal to or larger than a threshold value.

According to (6), it is possible to execute the adhering substance removal control when the actually measured output of the fuel cell deviates from the rated output calculated based on the output decrease amount by equal to or larger than the threshold value, and it is possible to recover the output of the fuel cell which is decreased due to the adhering substance.

(7) A vehicle including:
the information processing device according to any one of (1) to (6);
the fuel cell: and
the drive source.

According to (7), when it is determined that the rated output of the fuel cell is equal to or smaller than the threshold value, it is possible to execute the adhering substance removal control in which the nitrogen-enriched gas having a higher nitrogen concentration and a lower oxygen concentration than air is supplied to the fuel cell as the cathode gas. This enables the fuel cell to generate power at a high current and a low voltage as compared with a case where air is supplied to the fuel cell as the cathode gas. Therefore, it is possible to increase an output current of the fuel cell to increase generated water during power generation while preventing excessive electric power from being output from the fuel cell, and it is possible to actively clean an electrode of the fuel cell by the generated water. By removing an adhering substance adhered to the electrode, output decrease of the fuel cell due to the adhering substance can be reduced, and a rated output of the fuel cell can be recovered.

(8) An information processing device for predicting an output decrease amount of a fuel cell in a fuel cell system including the fuel cell, the information processing device including:
an acquisition unit configured to acquire use history information indicating a use history of the fuel cell system;
a prediction unit configured to predict the output decrease amount based on the use history information acquired by the acquisition unit and output decrease characteristic information indicating an output decrease characteristic of the fuel cell according to the use history; and
a control unit configured to execute predetermined processing based on the output decrease amount predicted by the prediction unit, in which
when the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

According to (8), when it is determined that the rated output of the fuel cell is equal to or smaller than the threshold value, it is possible to execute the adhering substance removal control in which the nitrogen-enriched gas having a higher nitrogen concentration and a lower oxygen concentration than air is supplied to the fuel cell as the cathode gas. This enables the fuel cell to generate power at a high current and a low voltage as compared with a case where air is supplied to the fuel cell as the cathode gas. Therefore, it is possible to increase an output current of the fuel cell to increase generated water during power generation while preventing excessive electric power from being output from the fuel cell, and it is possible to actively clean an electrode of the fuel cell by the generated water. By removing an adhering substance adhered to the electrode, output decrease of the fuel cell due to the adhering substance can be reduced, and a rated output of the fuel cell can be recovered.

What is claimed is:

1. An information processing device for predicting an output decrease amount of a fuel cell in a vehicle including the fuel cell and a drive source driven by electric power of the fuel cell, the information processing device comprising:
an acquisition unit configured to acquire use history information indicating a use history of the vehicle;
a prediction unit configured to predict the output decrease amount based on the use history information acquired by the acquisition unit and output decrease characteristic information indicating an output decrease characteristic of the fuel cell according to the use history; and
a control unit configured to execute predetermined control based on the output decrease amount predicted by the prediction unit, wherein
when the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

2. The information processing device according to claim 1, wherein
the adhering substance removal control is control for supplying cathode off-gas discharged from the fuel cell to a cathode supply path for supplying the cathode gas to the fuel cell.

3. The information processing device according to claim 1, wherein
the control unit further executes the adhering substance removal control when a predetermined period elapses from previous adhering substance removal control.

4. The information processing device according to claim 3, wherein
the predetermined period is a period in which at least one of a power generation time, the number of times of power generation, the number of times of fluctuations in an output voltage, and the number of times of fluctuations in an output current of the fuel cell reaches a predetermined value.

5. The information processing device according to claim 1, wherein
the control unit executes the adhering substance removal control when a temperature of a refrigerant which cools the fuel cell is equal to or lower than a threshold value.

6. The information processing device according to claim 1, wherein
the control unit further executes the adhering substance removal control when a difference between the rated output calculated based on the predicted output decrease amount and an actually measured output of the fuel cell is equal to or larger than a threshold value.

7. A vehicle comprising:
the information processing device according to claim 1;
the fuel cell; and
the drive source.

8. An information processing device for predicting an output decrease amount of a fuel cell in a fuel cell system including the fuel cell, the information processing device comprising:
an acquisition unit configured to acquire use history information indicating a use history of the fuel cell system;
a prediction unit configured to predict the output decrease amount based on the use history information acquired by the acquisition unit and output decrease characteristic information indicating an output decrease characteristic of the fuel cell according to the use history; and
a control unit configured to execute predetermined processing based on the output decrease amount predicted by the prediction unit, wherein
when the control unit determines that a rated output of the fuel cell is equal to or smaller than a threshold value based on the output decrease amount, the control unit executes adhering substance removal control in which nitrogen-enriched gas having a higher nitrogen concentration and a lower oxygen concentration than air is supplied to the fuel cell as cathode gas.

* * * * *